May 28, 1935.  R. N. PARK  2,002,793
ELECTRIC MOTOR CONSTRUCTION
Filed April 4, 1934

Inventor
Robert N. Park.
by
Attorney.

Patented May 28, 1935

2,002,793

UNITED STATES PATENT OFFICE 2,002,793

ELECTRIC MOTOR CONSTRUCTION

Robert N. Park, Los Angeles, Calif., assignor to Jess M. Roberts, Wilmar, Calif.

Application April 4, 1934, Serial No. 718,962

21 Claims. (Cl. 172—279)

My invention relates to electric motors that are mounted for bodily movement in response to the motor torque, particularly motor constructions in which such bodily movement of the motor affects the operating connection between the motor and the driven load, for example, as taught in my co-pending application, serially numbered 611,843, filed May 17th, 1932, and entitled "Electric motor construction".

In that disclosure, the motor, in response to the starting torque incidental to overcoming inertia of the rotor, rotates bodily from a normal de-energized position with the driving belt inoperatively slack, to an energized position with the belt operatively taut, such rotation providing a time interval for substantial acceleration of the rotor before the motor picks up the load.

The present invention, being an improvement on my prior disclosure, may be described generally as the combination with such a bodily rotatable motor of means to temporarily arrest such bodily rotation when the motor is initially energized.

The objects, advantages and general features of my invention may be understood from my detailed description to follow, taken with the accompanying drawing in which.

Figure 1:
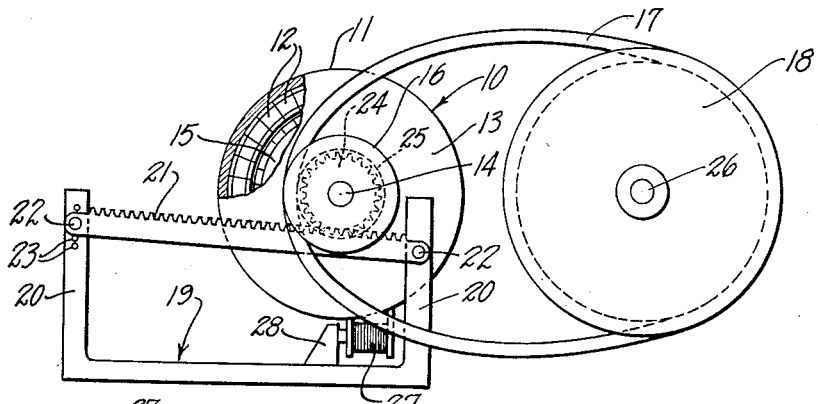
Fig. 1 is a front elevation of one form of my invention at normal de-energized position, being shown partly in section to reveal the interior of the motor.
Figure 2:
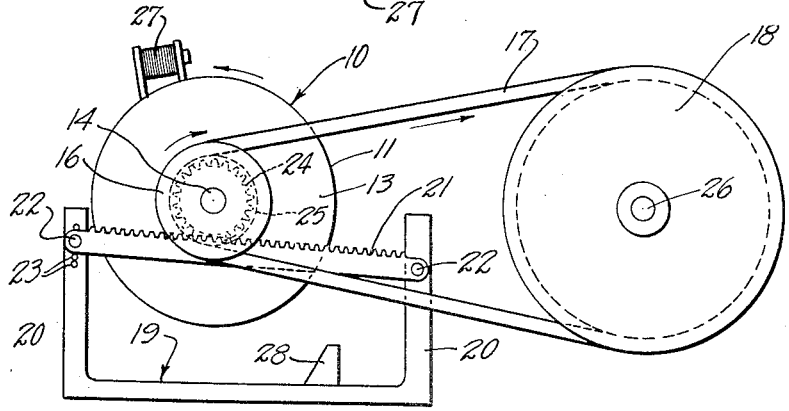
Fig. 2 is a similar view, with the motor shown in the running position.

In Figs. 1 and 2, the motor, generally designated 10, includes a housing or stator 11 of cylindrical configuration, fixed to the inner peripheral wall of which are stator windings 12. Revolvably journalled in the opposite end walls 13 of stator 11 is a motor shaft 14, to which is keyed, within the stator, rotor 15. Exterior to the stator a suitable drive pulley 16 is keyed to shaft 14. This pulley is connected by drive belt 17 with a driven pulley 18, which driven pulley may represent the load carried by motor 10.

The motor is mounted for rotary movement of stator 11 relative to motor base 19. Two spaced vertical standards 20 on each side of the motor rise from motor base 19 and are spanned by racks 21 assembled thereto by bolts 22. Preferably, one of the standards is provided with a vertical series of bolt holes 23, as shown, to provide for adjusting the inclination of the racks.

Integral with the two opposite end walls 13 of stator 11, and co-axial with motor shaft 14, are two pinions 24, each engaging one of the two racks 21. Preferably, the pinions are provided with circular flanges 25 abutting the inner faces of the racks. Pinions 24, engaging racks 21, support the motor and provide for rotative and transitory movement of the motor, while maintaining the required alignment of motor shaft 14 relative to shaft 26 of driven pulley 18.

Preferably, racks 21 are inclined with their lower ends disposed towards driven pulley 18, so that the motor tends to rest at the ends of the racks nearest the driven pulley, in which position a relatively short and stiff V-belt will tend to an oval shape, as shown in Fig. 1.

If, while the motor is at rest in the position shown in Fig. 1, the motor circuit is energized, the resulting motor torque reacts between stator 11 and rotor 15, the motor terminals being so connected that the torque tends to rotate the stator in a positive, i. e., counter-clockwise direction, as indicated by the arrow in Fig. 2, and to rotate the rotor in the opposite direction. The strength of the motor torque, within the limitations of the particular motor, varies with the resistance met by the torque. Consequently, during the period in which the rotor is being accelerated to its full running speed, i. e., while the force is acting against the inertia of the rotor, the motor torque is substantially greater than when the rotor is revolving at full running speed under no load. The result is that, during an interval of time following upon initial energization of the motor, a relatively strong torque is exerted in a direction to rotate pinions 24 along racks 21 away from driven pulley 18, in a direction to tighten belt 17. Tightening belt 17 brings in new resistance to the rotation of rotor 15, with the result that the motor torque is increased, and additional force is exerted through pinions 24 to further tighten belt 17. This cycle of effects is repeated until an equilibrium is established, rotor 15 carrying the full load of driven pulley 18. The tension of belt 17, and, therefore, the driving efficiency of the belt, will vary thereafter directly with the driven load.

The tightening of belt 17 from inoperative slackness is, in effect, a clutch action, and inasmuch as this "clutch" action is consummated only after a time interval following initial energization of the motor, the effect may be described as a "lag clutch" action. The purpose of providing such a lag is to permit the motor to become substantially accelerated before it picks up the load.

The advantages derived from incorporating in a motor construction means for delaying the operative connection of the motor to the load are well known to the art. The principle employed in such a clutch action is of particular advantage in a motor having a low starting torque. It is well known that certain types of electric motors cannot carry their rated loads until a normal running speed is attained. For instance, because of ordinances limiting the amperage in the starting windings of motors supplied by domestic wiring, a motor in a household device necessarily has low starting torque, a torque which, in the case of a domestic washing machine, may not be sufficient to carry the load desired. In industries, clutches of this type make possible the employment of relatively small motors for driving many types of machinery ordinarily run by relatively large motors.

As soon as the motor torque is destroyed by de-energization of the motor circuit, the driven load serves as a brake opposing the inertia of the rotating rotor, and the resulting reaction between pulley 16 and belt 17 in effect kicks the motor back to the normal de-energized position at the lower end of the racks. Because of this reverse reaction attendant upon de-energization of the motor, the inclination of the racks 21 need not be great enough to cause the motor to gravitate to the lower ends of the racks, but only great enough to maintain the motor at the lower ends of the racks.

In the structure recited to this point, comprising the general combination set forth in my previous disclosure, the duration of the time interval from initial energization of the motor to establishment of operating tension in the belt is the resultant of several factors. These factors comprise: the distance between the de-energized and the energized positions of the motor, the inclination of the two racks, the mass of the stator, the radius of gyration of the stator, the mass of the rotor, and the radius of gyration of the rotor.

Control of such a resultant is to be had only by manipulating the magnitudes of its constituent factors, and in the arrangement set forth, such control may be awkward and may involve objectionable features. For instance, in a given construction, it may be necessary to provide an inordinate amount of bodily rotation between the de-energized position and the energized position to give the rotor time to accelerate to a desired speed before the motor picks up the load. Such excessive rotation may enable the stator to gain so much momentum as to place a severe strain on the belt. Likewise, the momentum of such a motor moving back to the de-energized position may be objectionable.

Of the factors recited above, the mass and radius of gyration of the stator, and the mass and radius of gyration of the rotor, are not readily manipulated in a finished installation, and are, furthermore, independent of the speed of the rotor in that they offer no opportunity to relate the speed of the rotor to the aforesaid resultant time interval. While the other two factors, i. e., the distance between the two motor positions, and the inclination of the racks, are more readily manipulated than the above named factors, they are likewise independent of the speed of the rotor.

My present improvement consists in introducing a new factor, a means to arrest the bodily movement of the motor. This additional factor not only may be arranged for ready adjustment over any desirable time range, but also may be directly related to the speed of the rotor so that the resultant time interval may be determined directly by the speed of the rotor. Obviously, the means to arrest the bodily movement of the motor pending acceleration of the rotor may be any well-known form of time-latch, operating independently of the rotor, but I prefer, as suggested, to employ a latch responsive to the speed of the rotor.

For example, an electromagnet 27 may be mounted on the motor to cooperate with a complementary electromagnet armature 28 fixed to base 19. Preferably, armature 28 is positioned to serve as a stop to determine the de-energized position of the motor. Such a relationship insures contact between the electromagnet and the armature at the de-energized position.

While the energization of such an electromagnet may be controlled by any suitable means, I prefer to employ a centrifugal switch driven by the rotor of the motor. For instance, if the motor is a single-phase motor wound for split-phase starting, the magnetic latch may be in series with the starting winding to be controlled by the usual centrifugal switch incorporated in such a motor to cut out the starting winding.

Figure 6:
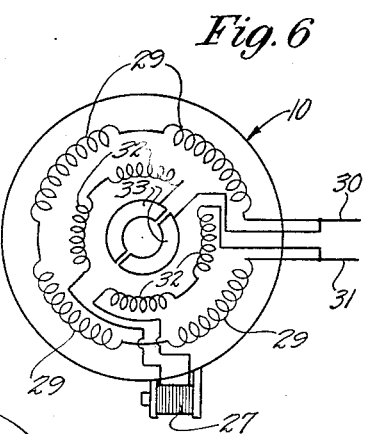
Fig. 6 is a wiring diagram of the circuits that may be incorporated in my invention.

Fig. 6 shows the wiring diagram of such an arrangement. The motor, generally designated 10, has the usual single-phase running winding 29, energized from line wires 30 and 31. Starting winding 32 is in parallel with running winding 29 and in series with electromagnet 27. The circuit through the starting winding includes two spaced contacts 33 of the usual type of automatic switch or centrifugal cut-out. Below a predetermined critical speed, contacts 33 are electrically connected by fingers (not shown), which move centrifugally outward clear of the contacts at the predetermined speed. The tension of springs (not shown) associated with the fingers may be readily regulated to determine the critical speed, in a manner well known to the art.

Assume the motor to be in the normal de-energized position shown in Fig. 1. Upon energization of the motor circuit, the starting torque will tend to rotate the motor bodily up the inclined racks, but such rotation will be prevented by the fact that the magnetic latch, comprising electromagnet 27 and electromagnet armature 28, is energized. As soon as the rotor is accelerated to the desired predetermined speed, the automatic cut-out mentioned will de-energize the electromagnet to permit the motor to move up the incline to tighten the driving belt. The automatic cut-out may be readily adjusted to de-energize the electromagnet while the rotor is still accelerating, in order that the release of the motor for bodily rotation may be timely with respect to the starting torque. If the motor is permitted to reach full running speed before it is released for bodily rotation, there may not be sufficient torque to move the motor into operative tension of belt 17.

It may be said that in such a construction the latch is responsive to the speed of the motor. It is apparent that if the motor employed has no starting winding, for example, if a polyphase motor is employed, the centrifugal switch employed will be used solely to control the electromagnet.

Figure 3:
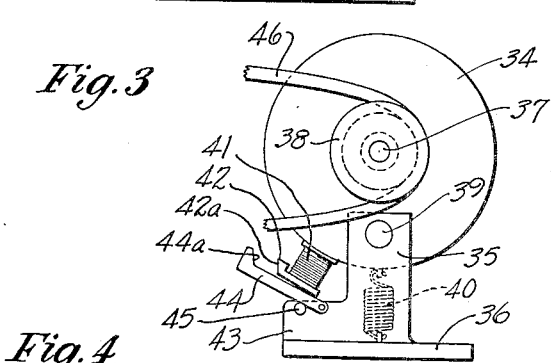
Fig. 3 is a front elevation of a modified form of my invention shown in the normal de-energized position.
Figure 4:
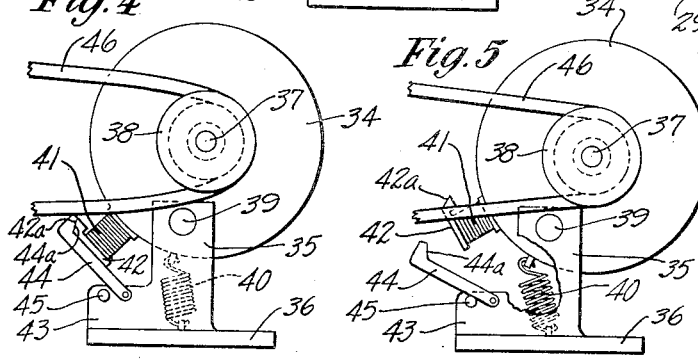
Fig. 4 is a similar view of the modification at an intermediate latched position.
Figure 5:
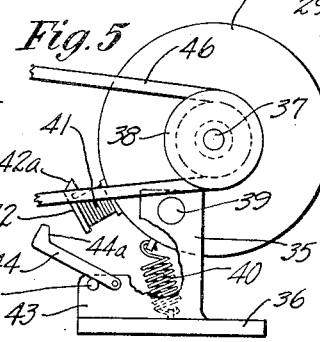
Fig. 5 is a similar view of the modification in running position.

Whereas in Figs. 1 and 2 a motor is shown mounted for bodily rotation about a moving axis, the modified form of my invention shown in Figs. 3, 4 and 5 is a motor mounted for rotation about a fixed axis.

Stator 34 is mounted eccentrically for pivotal support between spaced standards 35 of motor base 36. In the normal de-energized position of the motor, rotor shaft 37, carrying driving pulley 38, is directly above pivotal bearing 39 of the stator, the motor being held in this position by a suitable helical contractile spring 40 anchored at one end to the periphery of stator 34 and at the other end to base 36, as shown in Fig. 4.

Suitably mounted on the periphery of stator 34 is a radially disposed electromagnet 41 having, integral with its outer end, a shoe 42. Pivotally mounted on a suitable vertical extension 43 of base 36 is an electromagnet armature 44 positioned to coact with electromagnet 41. This armature is a latch having a shape complementary to that of shoe 42 on the electromagnet.

In the normal de-energized position of the motor, (Fig. 3), spring 40 holds the motor upright. Electromagnet 41 is near the pivoted end of latch 44, the latch resting against a suitable stop 45 on the motor base. Drive belt 46 is inoperatively slack.

The action of the electromagnet may be related to the speed of the rotor in the same manner as heretofore described. As soon as the motor is energized, it will tend to rotate bodily clockwise about bearing 39 against tension of spring 40. This bodily rotation will, however, be arrested by the latch arrangement described, because as soon as the motor is energized, latch 44 will be attracted into contact with shoe 42. It is contemplated, however, that the magnetic bond between the electromagnet and the latch will not be sufficient to stop the bodily rotation of the motor until inclined surface 42a of the shoe contacts complementary surface 44a of the latch. This intermediate position of the motor is indicated by Fig. 5.

It is further contemplated that at this intermediate position, belt 46 will not be taut enough to place any substantial portion of the load on the rotor of the motor, but will have tension sufficient, if the latch is released after the rotor has become fully accelerated, to provide adequate torque, by virtue of the belt connection between the load and the rotor, to cause continued clockwise bodily rotation of the stator to the position of maximum belt tension shown in Fig. 6.

Whereas in the first form of my invention it may be important that the magnetic latch be released before the rotor is fully accelerated, it is apparent that in this modification the timing of the release of the latch is not important, as the motor will move in a positive manner to the running position regardless of the timing of the latch action.

It will be noted that the angle of the contacting faces of the two complementary latch members is sufficient to provide a positive stop as long as there is a magnetic bond between the latch members, but the angle is such as to permit the pivoted latch-armature to drop readily out of engagement with the electromagnet shoe when the electromagnet is de-energized.

The two forms of my invention set forth have been described specifically for the purpose of complete disclosure, and to illustrate the principles involved. Obviously, these specific forms suggest further modifications and changes within the spirit of my invention, and it is to be understood that I reserve the right to all such changes and modifications that properly come within the scope of my appended claims.

Having described my invention, I claim:

1. The combination of: a motor mounted to rotate bodily from a de-energized position to an energized position in response to the motor torque; and means to delay such bodily rotation during a portion of the initial acceleration of the motor.

2. The combination of: a motor mounted to rotate bodily from a de-energized position to an energized position in response to the motor torque; and an automatic time latch to delay such bodily rotation during a portion of the initial acceleration of the motor.

3. A motor having in combination: a rotor; a stator; a base, said stator being mounted on the base to rotate from a de-energized position to an energized position in reactive response to the motor torque; releasable means to delay such rotation of the stator during initial acceleration of the rotor; and means responsive to speed changes of the rotor to release said delaying means at a predetermined speed of the rotor.

4. A motor having in combination: a rotor; a stator; a base, said stator being mounted on the base to rotate from a de-energized position to an energized position in reactive response to the motor torque; an electromagnet adapted when energized to hold the stator against such torque; an electric circuit to energize the electromagnet when the motor is initially energized; and means to break said circuit at a predetermined speed of the rotor.

5. A motor having in combination: a rotor; a stator; a base, said stator being mounted on the base to rotate from a de-energized position to an energized position in reactive response to the motor torque; an electromagnet adapted when energized to hold the stator against such torque; an electric circuit to energize the electromagnet when the motor is initially energized; and a centrifugal switch actuated by the rotor to break said circuit at a predetermined speed of the rotor.

6. The combination of: a motor base; a motor mounted on said base to rotate bodily from a de-energized position to an energized position in response to the motor torque; a starting circuit associated with the motor including means for automatic de-energization of said circuit after substantial acceleration of the motor; and electrically actuated means controlled by said circuit to releasably hold the motor against such bodily rotation while said starting circuit is energized.

7. The combination of: a motor base; a motor mounted on said base to rotate bodily from a de-energized position to an energized position in response to the motor torque; a running winding in the motor for normal single-phase operation; an auxiliary starting winding to provide split-phase starting of the motor; an automatic centrifugal switch to de-energize said starting winding at a predetermined speed of the motor;

and electrically actuated means controlled by said switch to arrest bodily rotation of the motor during an initial period of motor acceleration.

8. The combination of: a driven member; a driving member movable into and out of driving relation with the driven member; a rotor connected with the driving member to actuate the driving member and to move the driving member into and out of said driving relation with the driven member; a motor base; a stator encircling said rotor and electromagnetically associated therewith to constitute a motor, said stator being mounted on the motor base to rotate in response to the motor torque from a normal de-energized position with the driving member free of the driven member to an energized position with the driving member in driving relation with the driven member; and means to releasably arrest rotation of said stator from the normal de-energized position.

9. The combination of: a motor mounted to rotate bodily from a de-energized position to an energized position in response to the motor torque; a latch to arrest such bodily rotation of the motor; and an electromagnet adapted to move the latch into engagement with the body of the motor and to hold the latch in such engagement during an initial period of motor acceleration, said latch being adapted to move free of the motor body when the electromagnet is de-energized.

10. The combination of: a driven member; a driving member movable in a direction of increasingly efficient driving relation with the driven member and in the reverse direction; a rotor connected with the driving member to actuate the driving member and to move the driving member in said two directions; a motor base; a stator encircling said rotor and electromagnetically associated therewith to constitute a motor, said stator being mounted on the motor base to rotate in response to the motor torque from a normal de-energized position in a direction to move said driving member towards increasingly efficient driving relation with the driven member; and releasable means to arrest the rotation of the stator at a point of relatively inefficient driving relation between the driving member and the driven member during initial acceleration of the rotor.

11. The combination of: a driven member; a driving member movable in a direction of increasingly efficient driving relation with the driven member and in the reverse direction; a rotor connected with the driving member to actuate the driving member and to move the driving member in said two directions; a motor base; a stator encircling said rotor and electromagnetically associated therewith to constitute a motor, said stator being mounted on the motor base to rotate in response to the motor torque from a normal de-energized position in a direction to move said driving member towards increasingly efficient driving relation with the driven member; and releasable means to temporarily arrest the rotation of the stator during acceleration of the rotor at a point of relatively inefficient driving relation between the driving member and the driven member, said point of arrest being sufficiently advanced to provide a torque by virtue of the driving relation effective to rotate the stator in said direction of increasingly efficient driving relation when said arresting means releases the stator after acceleration of the rotor.

12. The combination of: a driven member; a driving member movable in a direction of increasingly efficient driving relation with the driven member and in the reverse direction; a rotor connected with the driving member to actuate the driving member and to move the driving member in said two directions; a motor base; a stator encircling said rotor and electromagnetically associated therewith to constitute a motor, said stator being mounted on the motor base to rotate in response to the motor torque from a normal de-energized position in a direction to move said driving member towards increasingly efficient driving relation with the driven member; electrically actuated means to releasably arrest the rotation of the stator during acceleration of the rotor at a point of relatively inefficient driving relation between the driving member and the driven member, said point of arrest being sufficiently advanced to provide a torque by virtue of the driving relation effective to rotate the stator in said direction of increasingly efficient driving relation when the rotor is fully accelerated; and a starting circuit associated with the motor adapted for automatic de-energization after substantial acceleration of the motor, said circuit including said electrically actuated means.

13. The combination of: a driven member; a driving member movable in a direction of increasingly efficient driving relation with the driven member and in the reverse direction; a rotor connected with the driving member to actuate the driving member and to move the driving member in said two directions; a motor base; a stator encircling said rotor and electromagnetically associated therewith to constitute a motor, said stator being mounted on the motor base to rotate in response to the motor torque from a normal de-energized position in a direction to move said driving member towards increasingly efficient driving relation with the driven member; means to releasably arrest the rotation of the stator during acceleration of the rotor at a point of relatively inefficient driving relation between the driving member and the driven member, said point of arrest being sufficiently advanced to provide a torque by virtue of the driving relation effective to rotate the stator in said direction of increasingly efficient driving relation when the rotor is fully accelerated; and means responsive to speed changes of the rotor adapted to control said arresting means.

14. The combination of: a motor; a base supporting the motor; a driving member carried by the motor; a driven member; a drive belt connecting the driving member and the driven member, said motor being mounted on the base to rotate in response to the motor torque from a normal de-energized position with the belt relatively slack to an energized position with the belt under operating tension, and vice versa; and automatic means to arrest the rotation of the motor from said normal position until substantial acceleration of the driving member is accomplished.

15. The combination of: a motor; a base supporting the motor; a driving member carried by the motor; a driven member; a drive belt connecting the driving member and the driven member, the motor being mounted on said base for initial rotation from a de-energized position with the belt relatively slack to an intermediate position with the belt less slack, said initial rotation being largely in reaction to acceleration of the rotor, and for subsequent rotation from said intermediate position to a final running position with the belt taut, said subsequent rotation being largely in response to load torque through the belt; and automatic means to arrest rotation of the motor at said intermediate position pending acceleration of the motor.

16. The combination of: a motor; a base supporting the motor; a driving member carried by the motor; a driven member; a driving belt connecting the driving member and the driven member, said motor being mounted on said base for initial rotation from a de-energized position with the belt relatively slack to an intermediate position with the belt less slack, said initial rotation being largely in reaction to acceleration of the rotor, and for subsequent rotation from said intermediate position to a final running position with the belt taut, said subsequent rotation being largely in response to load torque through the belt; and automatic means responsive to speed changes of the motor to arrest rotation of the motor at said intermediate position pending acceleration of the motor.

17. The combination of: a motor base; a motor mounted on the base to travel transversely thereon by bodily rotation in response to the motor torque from a normal de-energized position to an energized position; a magnet member; a complementary magnet-armature member, one of said members being fixed relative to the base, the other member being mounted on the motor, said members being positioned to be magnetically coupled when the motor is in said normal de-energized position; an electric circuit to energize said magnet to arrest bodily rotation of the motor during acceleration of the motor; and a switch adapted to break said circuit automatically at a predetermined speed of the motor, thereby releasing the motor for bodily rotation.

18. The combination of: a driven member; a driving member; a motor operatively associated with the driving member, said motor being mounted to rotate bodily in reactive response to the motor torque from a de-energized position with the driving member out of driving relation with the driven member to an energized position with the driving member in driving relation with the driven member; and means to delay such bodily rotation of the motor during a portion of the initial acceleration of the motor.

19. The combination of: a driven pulley; a driving pulley; a belt adapted to operatively interconnect said two pulleys; a motor carrying the driving pulley, said motor being mounted to rotate bodily in reactive response to the motor torque from a de-energized position with the belt inoperatively slack to an energized position with the belt operatively taut; and means to delay such bodily rotation of the motor during a portion of the initial acceleration of the motor.

20. The combination of: a driven member; a driving member; a motor operatively associated with the driving member, said motor being mounted to rotate bodily in reactive response to the motor torque from a de-energized position with the driving member out of driving relation with the driven member to an energized position with the driving member in driving relation with the driven member; releasable means to delay such bodily rotation of the motor during initial acceleration of the motor; and means responsive to speed changes of the motor to release said delaying means.

21. The combination of: a driven pulley; a driving pulley; a belt adapted to operatively interconnect said two pulleys; a motor carrying the driving pulley, said motor being mounted to rotate bodily in reactive response to the motor torque from a de-energized position with the belt inoperatively slack to an energized position with the belt operatively taut; a starting circuit associated with the motor including means for automatic de-energization of said circuit after substantial acceleration of the motor; and means controlled by said circuit to releasably hold the motor against such bodily rotation during initial acceleration of the motor.

ROBERT N. PARK.